US005374041A

United States Patent [19]

[11] Patent Number: 5,374,041

[45] Date of Patent: Dec. 20, 1994

Bernstein

[54] VISE

[75] Inventor: Leon M. Bernstein, Minnetonka, Minn.

[73] Assignee: Kurt Manufacturing Company, Inc., Fridley, Minn.

[21] Appl. No.: 201,790

[22] Filed: Feb. 25, 1994

[51] Int. Cl.[5] .................. B23Q 3/02

[52] U.S. Cl. .................. 269/136

[58] Field of Search .................. 269/32, 20, 24, 27, 269/134–138, 240, 244, 246, 250, 251

[56] References Cited

U.S. PATENT DOCUMENTS

| | | | |
|---|---|---|---|
| 21,470 | 9/1858 | Harrison et al. . | |
| 1,327,459 | 3/1921 | Schwarz . | |
| 1,951,869 | 3/1934 | Janiszewski | 90/60 |
| 2,708,382 | 5/1955 | Olson | 81/17.2 |
| 2,873,653 | 2/1959 | Wilson | 90/59 |
| 3,927,872 | 5/1975 | Sessody | 269/32 |
| 4,221,369 | 9/1980 | Takasugi | 269/138 |
| 4,223,879 | 9/1980 | Wolfe et al. | 269/136 |
| 4,295,641 | 10/1981 | Boucher | 269/136 |
| 4,345,750 | 8/1982 | Glaser | 269/136 |
| 4,834,358 | 5/1989 | Okolischan et al. | 269/309 |
| 4,901,990 | 2/1990 | Frechette | 269/25 |
| 5,064,321 | 11/1991 | Barnes | 409/219 |
| 5,181,700 | 1/1993 | Yonezawa | 269/24 |

*Primary Examiner*—Robert C. Watson
*Attorney, Agent, or Firm*—Westman, Champlin & Kelly

[57] ABSTRACT

A vise for clamping a workpiece against a stop includes a base and a clamping member. The base contains a cylindrical sliding element having an inclined surface, which engages and aligns with a surface of another cylindrical element that is perpendicular to the first-mentioned element and located in an aperture in the clamping member. Angular engagement of the mating surfaces creates both clamping and holddown forces on the clamping member.

20 Claims, 5 Drawing Sheets

10
73
70
72
76
78
90
92
94
96
98
100
102
2
3
86A
88A
87A
86B
88B
87B
22
34A
34B
14
30
34
36

VISE

BACKGROUND OF THE INVENTION

The present invention relates to a vise for clamping a workpiece. In particular, the vise of the present invention includes means for exerting a downward force upon the workpiece when the workpiece is clamped against a stop.

The prior art has advanced many types of vises for holding workpieces to be machined. Commonly, these vises include a moveable clamping member having a clamping surface for clamping the workpiece against a suitable stop. Simply clamping the workpiece with forces reacted between the stop and the clamping member, however, is not preferred. Rather, there is a need to also generate holddown forces which urge the workpiece downwardly against a platen working surface. The holddown forces counteract a tendency of the workpiece to lift during clamping and machining.

Some prior art vises have attempted to produce both clamping and holddown forces. For instance, U.S. Pat. No. 4,345,750 issued to Glaser discloses a sliding block used to clamp a workpiece against an abutment. The sliding block is urged toward the abutment by a threaded drive screw. The sliding block has a pin and a wedge located therein. The wedge has a flat surface that contacts a flat surface of the pin at a 45° angle. An end of the drive screw contacts the wedge at an end opposite the pin to drive the sliding block toward the abutment. However, since both the pin and the wedge are located in the same sliding block, holddown forces do not exist.

SUMMARY OF THE INVENTION

A vise for clamping a workpiece against a stop includes a base and a moveable clamping member. A first aligning element slides relative to the base to provide a first moveable surface. A second aligning element has a second surface that moves relative to the clamping member. The second surface engages and aligns with the first moveable surface. A drive mechanism drives the first moveable surface relative to the base to move the clamping member toward the stop.

Preferably, the first aligning element comprises a cylinder mounted in a cylindrical aperture formed in a stand-off of the base, while the second aligning element comprises a cylindrical segment mounted in an aperture of the clamping member. Both elements rotate within each corresponding aperture to ensure planar contact between the first and second surfaces. The cylinder has a front portion in the shape of a wedge. Contact between the first and second surfaces is made at an inclined angle so as to develop both clamping forces to secure the workpiece against the stop and holddown forces to hold the workpiece against a platen working surface. Since one of the aligning elements is located in the base and the other aligning element is located in the moveable clamping member, single axial action of the aligning element in the base creates both clamping and holddown forces on the clamping member.

DETAILED DESCRIPTION OF THE PREFERRED EMBODIMENTS

Figure 1:
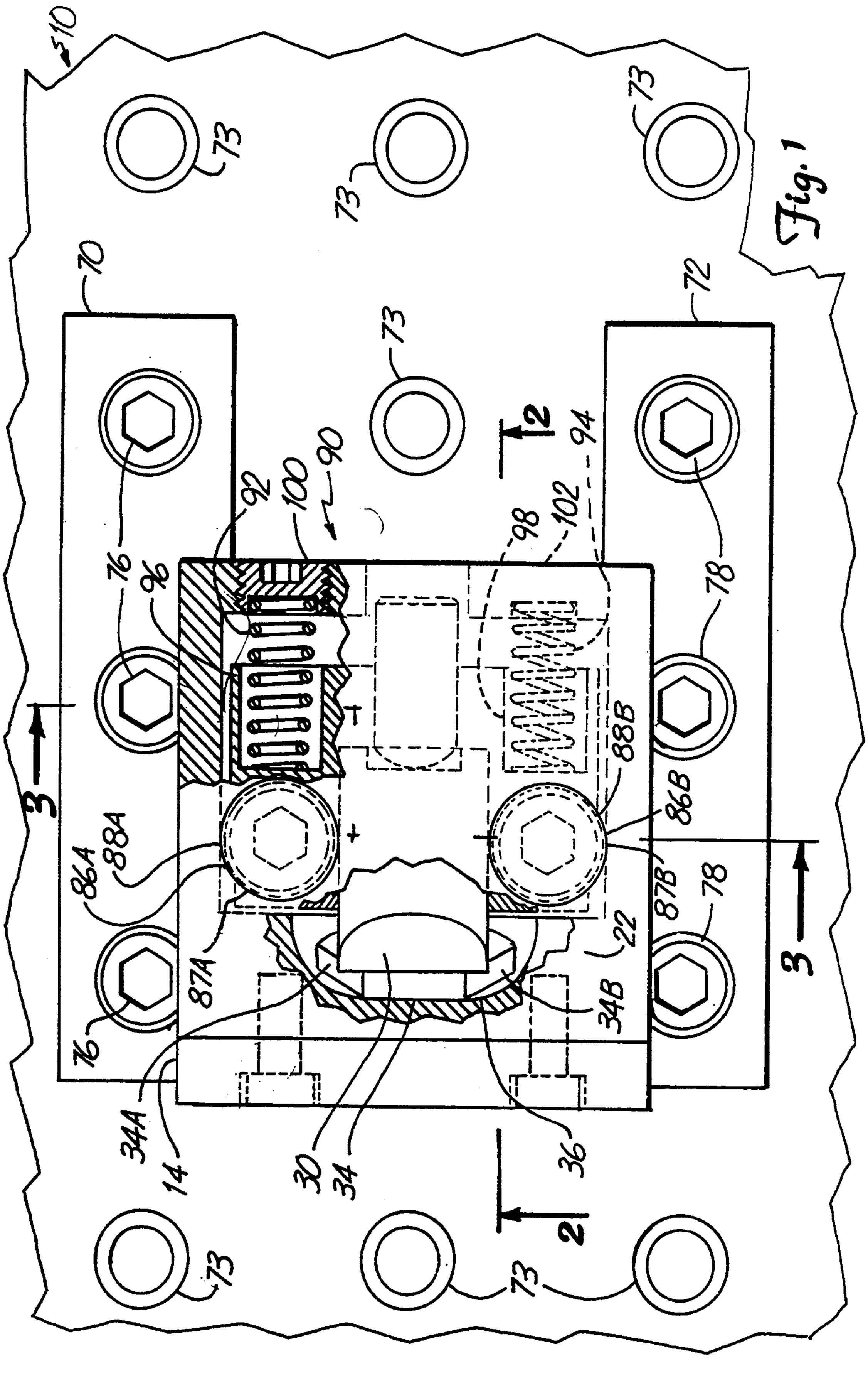
FIG. 1 is a top plan view of a vise of the present invention with portions broken away.
Figure 2:
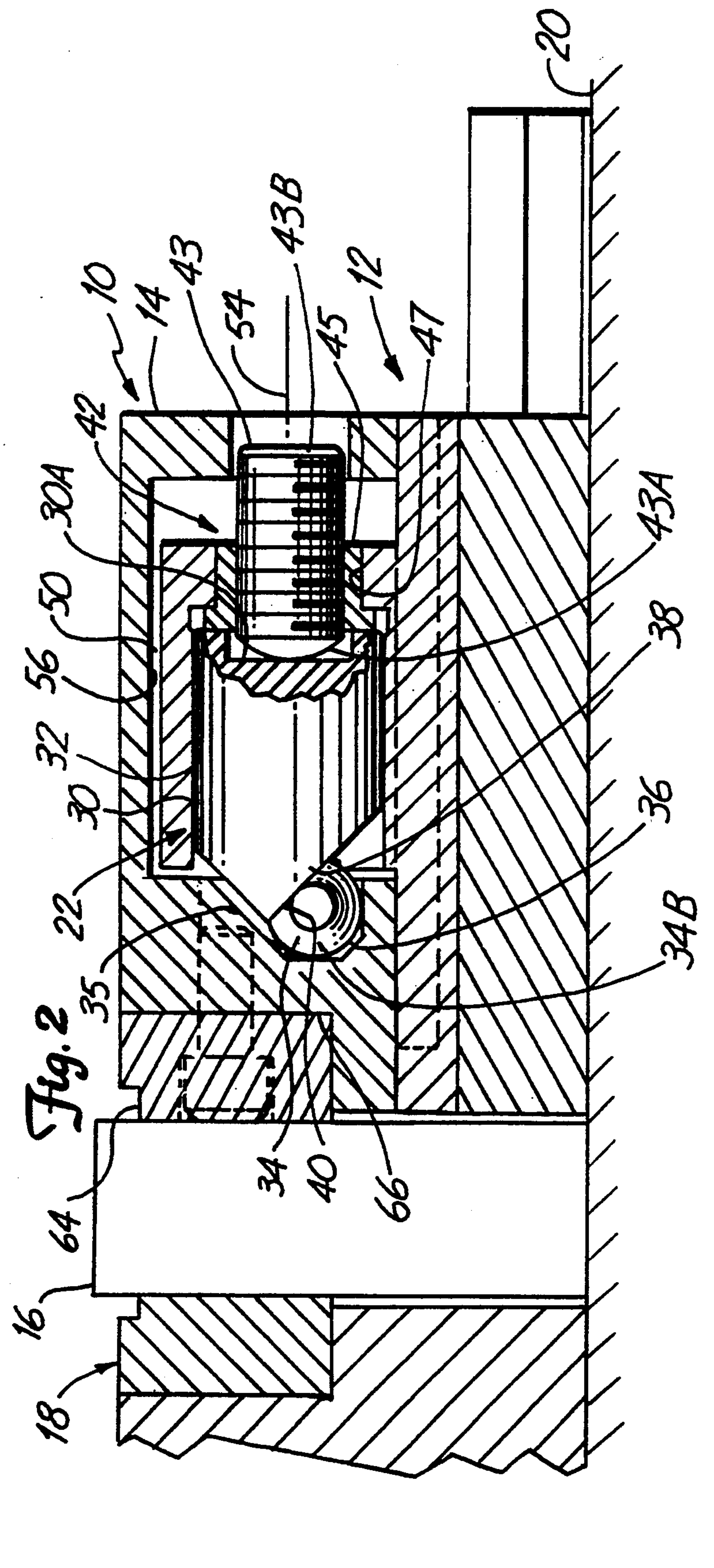
FIG. 2 is a sectional view of the vise taken along lines 2—2 in FIG. 1.

FIGS. 1 and 2 illustrate a vise 10 of the present invention. Generally, the vise 10 includes a base indicated at 12. A clamping member 14 moves relative to the base 12 to clamp a workpiece 16 against a stop indicated generally at 18. The base 12 is secured to a platen working surface 20. The vise 10 develops both clamping forces to clamp the workpiece 16 against the stop 18 and holding forces to hold the workpiece 16 against the platen working surface 20 when an actuator 22 moves the clamping member 14 relative to the base 12.

The actuator 22 includes two aligning elements that align with each other during vise operation. A first aligning element 30 is preferably cylindrical and located in a cylindrical aperture 32 formed in the base 12. A second aligning element 34 is disposed in the clamping member 14 constrained laterally by an aperture 36. The first aligning element includes a first surface 38 that is preferably flat, while the second aligning element 34 includes a second surface 40 that is also preferably flat. During vise operation, the first aligning element 30 slides toward the second aligning element 34 urged forward by a drive mechanism 42. The first surface 38 engages the second surface 40, the surfaces aligning with each other at an inclined angle. Alignment of the first surface 38 and the second surface 40 insures planar contact between the first aligning element 30 and the second aligning element 34. Contact of the first surface 38 with the second surface 40 at an inclined angle provides both clamping forces to secure the workpiece 16 against the stop 18 and holddown forces to secure the workpiece 16 against the platen working surface 20. Preferably, the first surface 38 and the second surface 40 have a contact angle between 30° and 45° as measured from the axial movement of the first aligning element 30.

Although the vise 10 has been illustrated where movement of the first aligning element 30 is parallel to the platen working surface 20, it should be understood that this is but on example. For instance, the first aligning element 30 could be oriented for movement perpendicular to the platen working surface 20 and still create clamping and holddown forces on the clamping member 14 since the surfaces 38 and 40 mate at an inclined angle. Other angular positions of the first aligning element 30 are also possible. Of course, if the angle is greater than 45 the first aligning element must be rotated around its axis 180. In addition, sliding movement between the mating surfaces will occur for any angles not parallel to the sliding surface of the clamping member 14.

Figure 3:
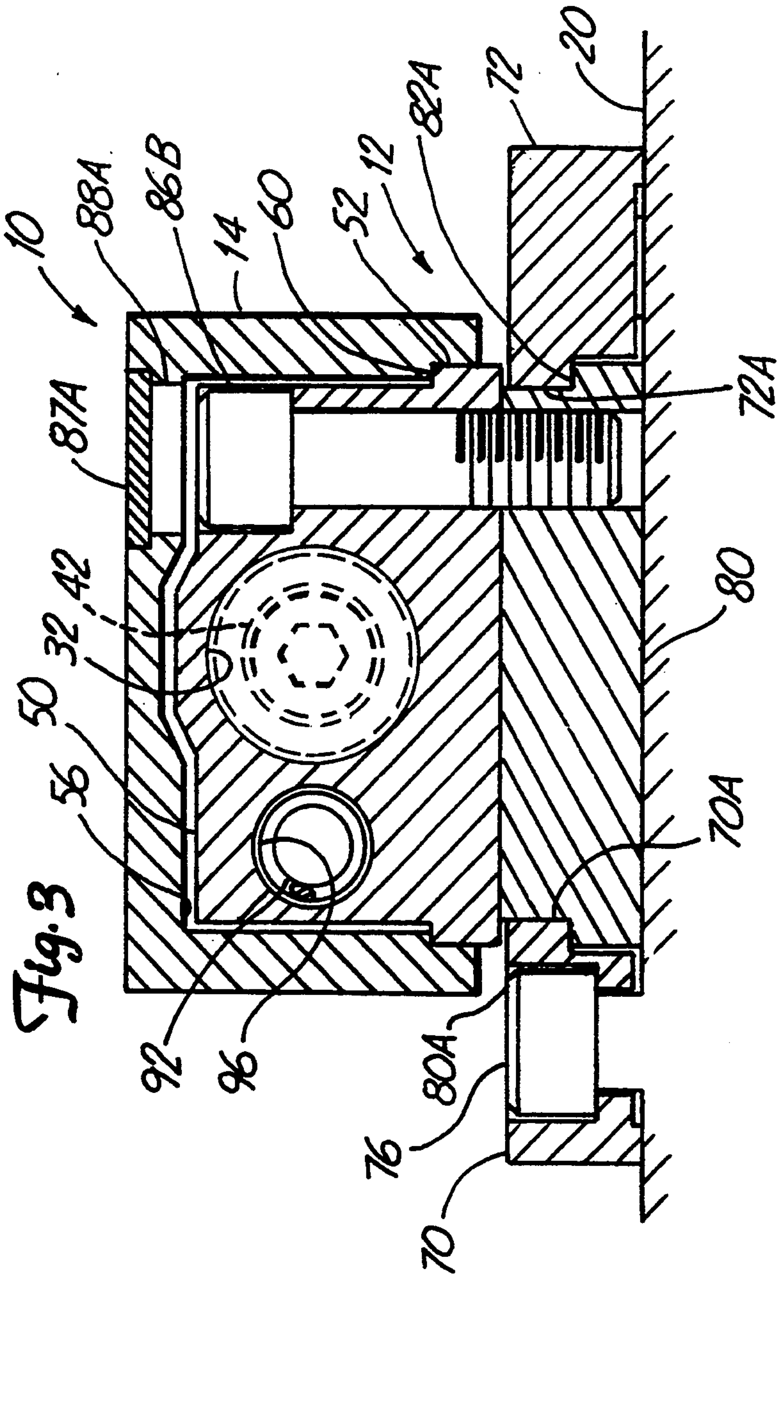
FIG. 3 is a sectional view of the vise taken along lines 3—3 in FIG. 1.

The second aligning element 34 is semicylindrical having ends 34A and 34B for centering. The second aligning element 34 is positioned generally perpendicular to the first aligning element 30. The second aligning element 34 rotates within the aperture 36 thereby allowing proper alignment and contact between the second aligning element 34 and the first aligning element 30 when mated. No other portion of the first aligning element 30 comes into contact with the clamping member 14 because of a clearance gap provided at 35. Without direct contact of the first aligning element 30 with the clamping member 14, all forces transmitted to the clamping member 14 are transmitted through the second aligning element 34. Preferably, the second aligning element 34 engages perpendicular side walls 36A and 36B of the aperture 36. Referring also to FIG. 3, the base 12 includes a stand-off portion 50 extending from a lower plate portion 52 to guide the clamping member 14. The aperture 32 is located in the stand-off portion 50 having an axis 54 generally parallel to the platen working surface 20. In the preferred embodiment, the clamping member 14 is a movable cover housing having an inner cavity 56 with the stand-off portion 50 located therein. The clamping member 14 provides a protective cover for the aligning elements 30 and 34, and the drive mechanism 42. The clamping member 14 is guided upon an upper surface 60 of the lower plate portion 52 and, if desired, includes a removable jaw plate 64 fastened to a side surface 66 facing the workpiece 16.

Guide rails 70 and 72 allow the base 12 to be adjusted relative to the stop 18. Preferably, the platen working surface 20 includes a plurality of spaced apart mounting apertures 73 to allow various vise mounting positions. The guide rails 70 and 72 are fastened to the platen working surface 20 using the mounting apertures 73 and a plurality of conventional fasteners indicated at 76 and 78, respectively. Each guide rail 70 and 72 includes an inward extending shoulder 70A and 72A, respectively. A movable plate member 80 includes two complimentary shoulders 82A and 84A that engage shoulders 70A and 72A, respectively. The base 12 is secured to the plate 80 with suitable fasteners 86A and 86B. Preferably, the fasteners 86A and 86B are recessed within the base 12 so as not to interfere with movement of the clamping member 14 relative to the base 12. Apertures 88A and 88B are provided through the clamping member 14 to allow access to the fasteners 86A and 86B without removal of the clamping member 14. Removable covers 87A and 87B cover the fasteners 86A and 86B, respectively.

With the base 12 secured to the plate 80 which, is positioned below shoulders 70A and 72A, the base 12 can be selectively positioned on the platen working surface 20. The fasteners 76 and 78 draw the guide rails 70 and 72 toward the platen working surface 20, thereby securing the base 12 in position. Preferably, the fasteners 86A and 86B are spaced apart from each other so as to coincide with the spacing of the mounting holes 73 provided in the platen working surface 20. This enables the base 12 to be secured directly to the platen working surface 20 using the mounting apertures 73 if desired. Although illustrated with spaced-apart mounting apertures 73, other suitable mounting apertures such as channels for slidable T-nuts could also be used as is well known.

In the embodiment illustrated in FIGS. 1-3, the drive mechanism 42 includes a drive screw 43 threadably mating with an insert 45. The insert 45 is mounted in an aperture 47 that opens to the cylindrical chamber 32. The drive screw 43 includes a first end 43A that contacts the first aligning element 30 on an end surface 30A, which, as illustrated, is recessed within the first aligning element 30. The drive screw 43 includes a second end 43B to receive a suitable drive tool, not shown.

As illustrated in FIGS. 1 and 3, a retraction mechanism 90 retracts the clamping member 14 away from the workpiece 16. The retraction mechanism 90 includes two springs 92 and 94 that are located between the standoff portion 50 and an inner surface of the clamping member 14. Springs 92 and 94 are located in corresponding apertures 96 and 98, respectively, provided on each side of the drive mechanism 42. In the embodiment illustrated, the clamping member 14 includes removable cover members 100 and 102 that allow access to the springs 94 and 96. Operation of the drive mechanism 42 causes the clamping member 14 to be displaced toward the workpiece 16, and further causes compression of the springs 94 and 96. Opposite movement of the drive mechanism 42 allows the springs 94 and 96 to expand and move the clamping member 14 away from the workpiece 16.

Figure 4:
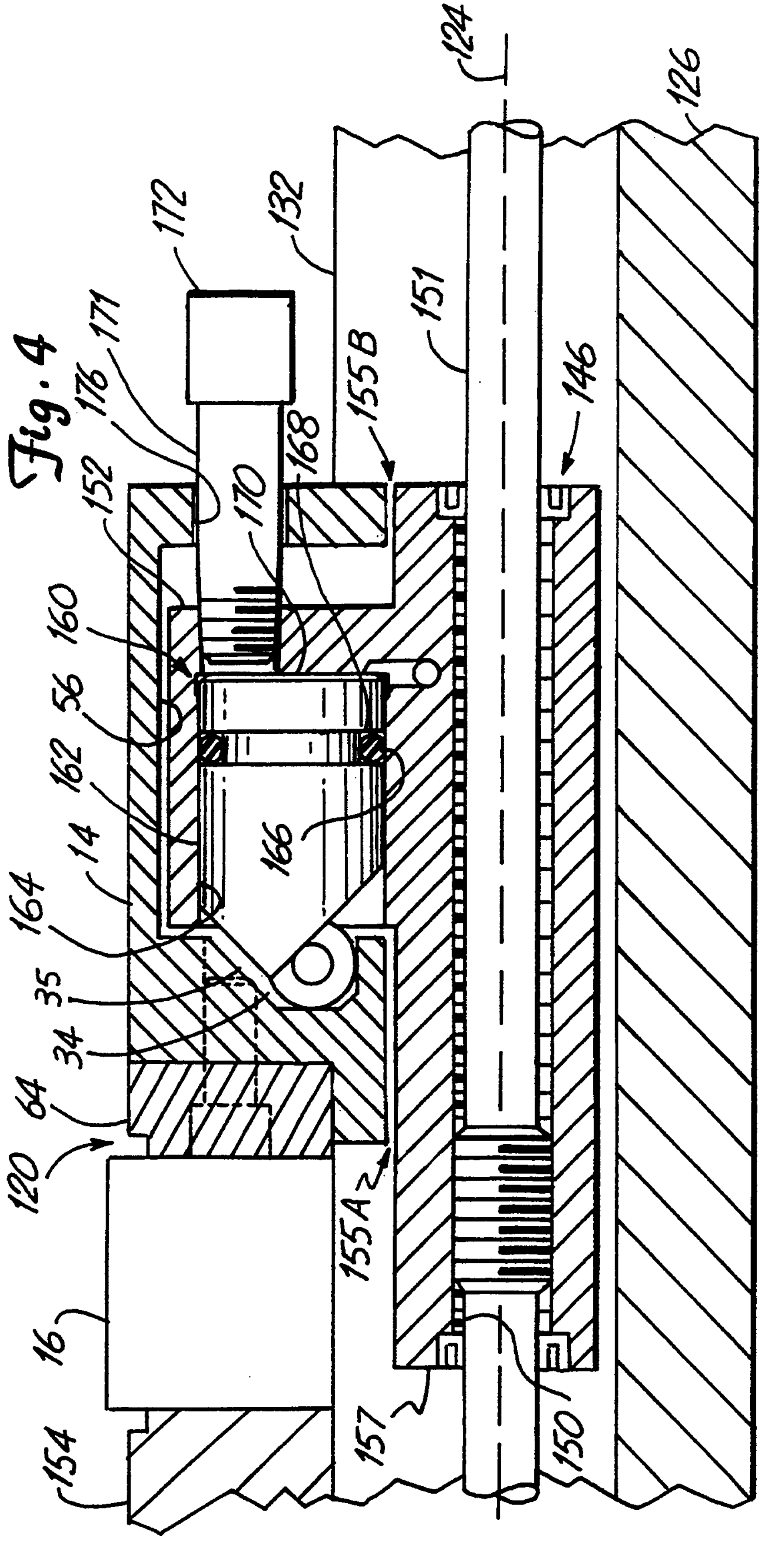
FIG. 4 is a side sectional view of a second embodiment of a vise of the present invention.
Figure 5:
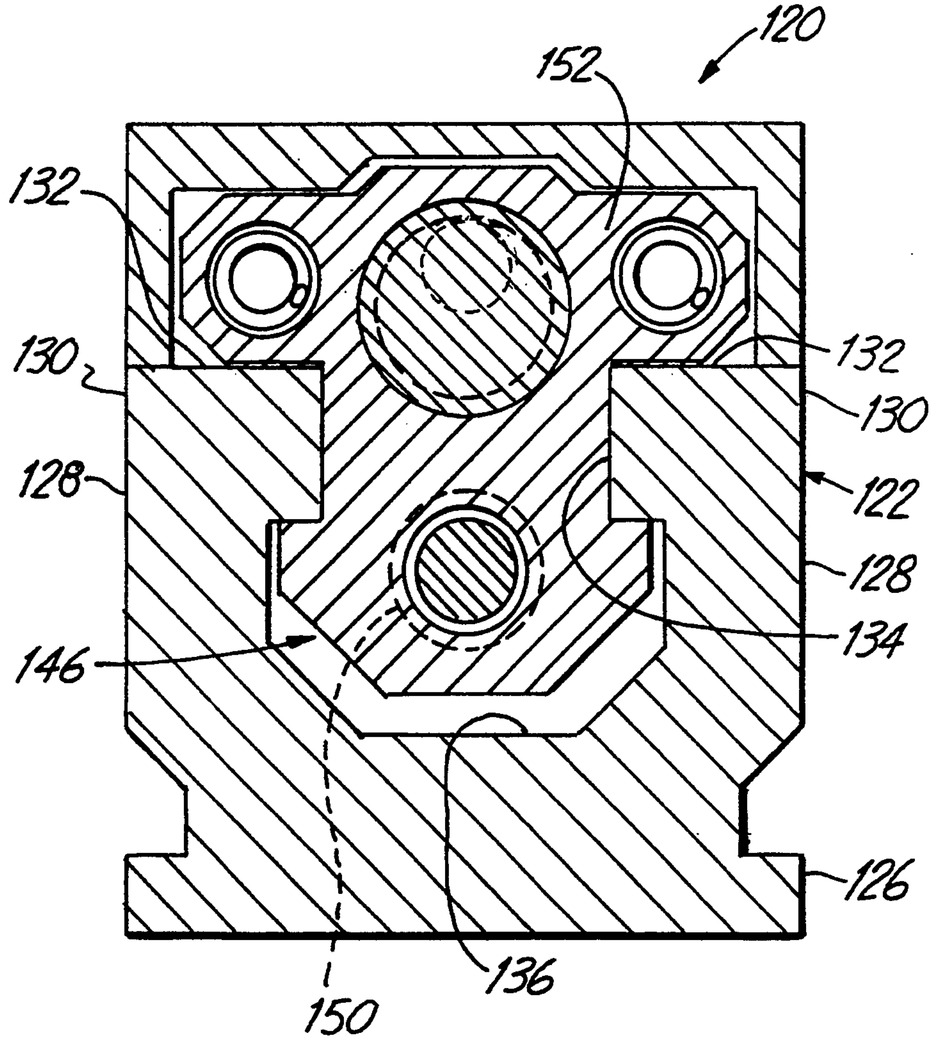
FIG. 5 is an end sectional view of the vise of the second embodiment.

A second embodiment of the vise of the present invention is illustrated in FIGS. 4 and 5 at 120. The vise 120 includes an elongated vise body 122 having a longitudinal central axis 124 and a base plate 126. Referring to FIG. 5, sidewalls 128 extend upwardly from the base plate 126 and extend along the length of the vise body 122. Upper rail portions 130 at the upper ends of the sidewalls 128 each form a top rail or platen surface 132, which are spaced apart and extend along the length of the vise body 122. The spaced apart rail surfaces 132 form a longitudinal slot 134 that is along the longitudinal central axis 124. The spaced apart rail surfaces 132 are generally flat and parallel to each other. The sidewalls 128, base plate 126 and the upper rail portions 130 further define an elongated interior channel 136 that extends along the longitudinal central axis 124.

A movable jaw assembly 146 includes an internally threaded cylindrical hub or bore 150 in a base portion 157, and a stand-off portion 152 extending therefrom. In the embodiment illustrated, a drive screw 151 drives the movable jaw assembly 146 toward a suitable stop 154. The stop 154 can be a fixed stop joined to the vise body 122 or a second movable jaw assembly that is also threadably connected to the drive screw 151.

FIGS. 4 and 5 further illustrate a second drive mechanism 160 for displacing the clamping member 14 relative to the stand-off portion 152. Like the drive mechanism 42 described above, the drive mechanism 160 includes a first aligning element 162 rotatably and slidably mounted in an aperture 164 of the stand-off portion 152. The first aligning element 162 engages the second aligning element 34 in a manner similar to that described above. The drive mechanism 160 slides the clamping member 14 on the rail surfaces 132 toward the stop 154, the clamping member 14 being spaced-apart from the base portion 157 as illustrated with clearance gaps 155A and 155B.

The first aligning element 162, functioning as a single-acting piston, will move axially with respect to the cylindrical aperture 164 through selective pressurization of a chamber 170. The first aligning element 162 includes an annular seal 166 located in an annular groove 168. A fitting 171 fluidly connects the chamber 170 to a suitable pressure source 172. The fitting 171 extends through an aperture 176 in the clamping member 14. The aperture 176 is of sufficient size to allow the clamping member 14 to move relative to the fitting 171 upon selective pressurization of the chamber 170.

In operation, the moveable jaw assembly 146 is positioned by the drive screw 151 so as to clamp the workpiece 16 between the jaw plate 64 and the stop 154. Initial clamping and holding forces can be applied to the workpiece 16 from the drive screw 151 with clamping and holding forces increased selectively by operation of the drive mechanism 160.

As a second method of operation, the moveable jaw assembly 146 can be positioned manually by the drive screw 151 to allow insertion and removal of the workpiece 16 between the jaw plate 64 and the stop 154. Clamping and holding forces are then applied through operation of the hydraulic drive mechanism 160. A retraction mechanism such as illustrated in FIGS. 1-3 and described above can be incorporated to automatically retract the clamping member 14 if desired.

As stated above, a second moveable jaw assembly can be also joined to the drive screw 151. Preferably, the second moveable jaw assembly is threadably joined to the drive screw 151 using different direction threads than provided in bore 150 so as to facilitate simultaneous inward and outward movement of the jaw assemblies toward and away from a center fixed jaw to clamp two workpieces. Although each jaw assembly could include a separate moveable clamping member with its own drive mechanism, as an alternative embodiment, one drive mechanism 160 can be used with a second jaw assembly that has a clamping member rigidly joined to the drive screw 151 for axial displacement of the drive screw 151. When constructed in this manner the drive screw 151 would float so that when the drive mechanism 160 is operated, the clamping member 14 would be pushed toward the center fixed jaw to clamp the first workpiece, while the drive screw 151 is simultaneously pulled in order to pull the second jaw assembly toward the center fixed jaw to clamp the second workpiece.

In summary, the present invention provides a vise that applies clamping forces and holddown forces to a workpiece. The vise is compact and either can be operated to provide all clamping forces or mounted to a moveable jaw assembly so as to increase the clamping forces upon the workpiece. With the clamping member comprising a moveable cover housing, many components of the vise are protected from damage.

Although the present invention has been described with reference to preferred embodiments, workers skilled in the art will recognize that changes may be made in form and detail without departing from the spirit and scope of the invention.

What is claimed is:

1. A vise for clamping a workpiece against a stop, the vise comprising:

a base having an aperture;

a first aligning element slidably disposed in the aperture to provide a first surface moveable relative to the base;

a clamping member having a clamping surface to engage the workpiece;

a second aligning element joined to the clamping member to provide a second surface moveable relative to the clamping member; and drive means for driving the first aligning element relative to the base to move the clamping member toward the stop; and wherein the first aligning element is self-rotatable in the aperture such that the first surface engages and aligns with the second surface.

2. The vise as specified in claim 1 wherein the base includes a plate portion and a stand-off portion, the stand-off portion having the aperture formed therein.

3. The vise as specified in claim 2 wherein the first aligning element is wedge-shaped.

4. The vise as specified in claim 3 wherein the first surface and the second surface are flat.

5. The vise as specified in claim 1 wherein the drive means comprises a drive screw.

6. The vise as specified in claim 1 wherein the aperture comprises a chamber and the drive means comprises a source for selectively pressurizing the chamber.

7. The vise as specified in claim 2 and further comprising means for retracting the clamping member away from the workpiece.

8. The vise as specified in claim 7 wherein the means for retracting comprises a spring operably coupled to the base and the clamping member.

9. The vise as specified in claim 8 wherein the clamping member comprises a housing positioned over the stand-off, and wherein the spring is located between an inner surface of the housing and the stand-off.

10. The vise as specified in claim 1 and means for positioning the base relative to the stop.

11. The vise as specified in claim 10 wherein the means for positioning includes a drive screw.

12. The vise as specified in claim 10 wherein the means for positioning includes a guide rail, the base sliding relative to the guide rail.

13. A vise for clamping a workpiece against a stop, the vise comprising:

a base mounted to a platen working surface, the base including a cylindrical aperture having a longitudinal axis;

a first cylindrical element slidably disposed in the cylindrical aperture and having a first surface angled with respect to the longitudinal axis;

a housing having a clamping surface facing the stop;

a second cylindrical element joined to an inner surface of the housing, the second cylindrical element having a longitudinal axis perpendicular to the first-mentioned longitudinal axis and a second surface moveable relative to the housing, the second surface engaging and aligning with the first surface, and wherein the housing covers an area of the engaging surfaces; and drive means for driving the first cylindrical element relative to the base to move the housing toward the stop; and means for retracting the housing away from the workpiece.

14. The vise as specified in claim 13 wherein the drive means comprises a drive screw.

15. The vise as specified in claim 13 wherein the cylindrical aperture comprises a chamber and the drive means comprises a source for selectively pressurizing the chamber.

16. The vise as specified in claim 13 wherein the means for retracting comprises a spring operably coupled to the base and the housing.

17. The vise as specified in claim 16 wherein the base includes a stand-off; and wherein the cylindrical aperture is formed in the stand-off; and wherein the spring is located between an inner surface of the housing and the stand-off.

18. The vise as specified in claim 13 and means for positioning the base relative to the stop.

19. The vise as specified in claim 18 wherein the means for positioning includes a drive screw.

20. The vise as specified in claim 18 wherein the means for positioning includes a guide rail, the base sliding relative to the guide rail.

* * * * *